Feb. 10, 1931. E. H. BROWN 1,791,657
CASING SUPPORT
Filed May 15, 1929 2 Sheets-Sheet 1

Inventor
E. H. Brown
By G. P. Dulin
Attorney

Feb. 10, 1931.  E. H. BROWN  1,791,657

CASING SUPPORT

Filed May 15, 1929   2 Sheets-Sheet 2

Inventor
E. H. Brown
by  G. P. Belvin
Attorney

Patented Feb. 10, 1931

1,791,657

UNITED STATES PATENT OFFICE

EDWIN H. BROWN, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE

CASING SUPPORT

Application filed May 15, 1929. Serial No. 363,364.

The present invention relates in general to improvements in supporting structure for rotary machines such as steam turbines, and relates more specifically to improvements in the construction and operation of instrumentalities for accommodating and for advantageously utilizing relative movement between the casings, bearings and rotor, resulting from distortion of one or more of these parts due to changes in conditions either within or external of a rotary machine.

In some machines embodying a casing, a rotor disposed within the casing, and bearings supporting the rotor, these parts are occasionally subjected to conditions which cause abnormal relative movement of the elements due to unequal expansion or distortion, thereby introducing danger of seriously damaging the structure. Such abnormal relative movement of the elements may result from various causes, such as changes in pressure or temperature produced by convection currents of air, steam or other fluid, cooperating with unsymmetrical machine elements to produce relative expansion or contraction thereof. Under such conditions, rotary machines such as steam turbines are especially subject to serious damage, since abnormal relative longitudinal movement between the casing and rotor, may cause the relatively thin rotor parts to engage the internal casing structure and to thus injure the contacting elements. Due to the necessary utilization of relatively massive flanges for the purpose of rigidly uniting the casing sections of steam turbines operating under high pressure, the casing distortion becomes extremely objectionable in such machines, unless suitable provision is made for compensating for such distortion. So far as known, no satisfactory method has heretofore been suggested for effectively compensating for such abnormal relative movement of parts in steam turbines or the like, and for advantageously utilizing the abnormal distortion of parts.

It is an object of the present invention to provide simple and effective structure for compensating and for advantageously utilizing abnormal relative movement between the parts of rotary machines, so as to eliminate undesirable or destructive results. Another object of the invention is to provide improved structure for compensating for relative movement due to expansion or contraction, of the rotating and stationary parts of rotary machines. A further object of the invention is to provide structural means for utilizing relative movement of machined parts of devices such as steam turbines, and for preventing contact between the rotary and stationary elements by increasing the clearance between these elements. It is a further object of the invention to provide supporting structure for machines such as steam turbines, whereby the elements may expand or contract freely in predetermined directions. Still another object of the invention is to provide improved supporting structure especially applicable to the inlet end of a steam turbine casing, which will permit relatively symmetrical design of the casing, and which will not transmit motion resulting from distortion or unequal expansion of the casing, to the rotor or to the bearing structure which supports the rotor. These and other objects and advantages will be apparent from the following description.

A clear conception of an embodiment of the invention and of the construction and operation of supports built in accordance therewith, may be had by referring to the drawings accompanying and forming a part of this specification in which like reference characters designate the same or similar parts in the various views.

Figures 5, 6:
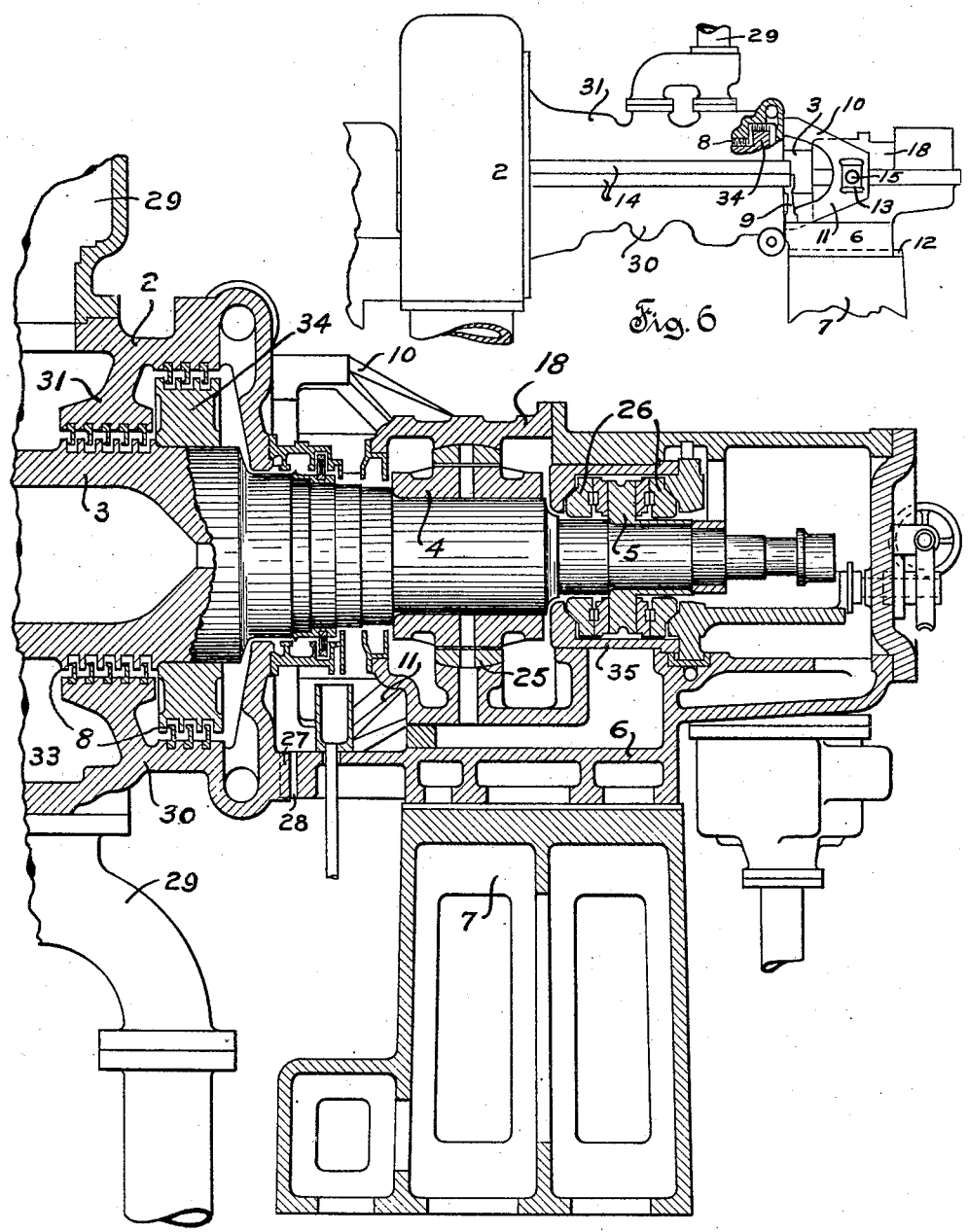
Fig. 5 is a central longitudinal section through the casing support and rotor bearing structure of the turbine.
Fig. 6 is a diagrammatic part sectional side view of a steam turbine, illustrating the assemblage and mode of operation of a structure built in accordance with the present invention.

As diagrammatically illustrated in Fig. 6, the improvement is applied to a Parsons type of steam turbine consisting generally of a cylinder or casing 2 comprising a lower section 30 and an upper section 31; a spindle or rotor 3 housed within the casing 2; and supporting structure for the casing and the rotor. The casing sections 30, 31 are provided with relatively heavy flanges 14 for fastening these sections together, and are also provided with end openings through which the shaft of the rotor 3 extends. One end of the main casing is rigidly attached to a foundation, and the corresponding end of the supporting shaft for the rotor 3 is mounted in an ordinary bearing.

With this arrangement of elements, the influence of temperature or pressure changes will cause the casing and the rotor to expand longitudinally away from the stationarily supported end, and such expansion must be compensated for.

Due to the desirable use of relatively heavy flanges 14 connecting the casing sections 30, 31, there will necessarily be unequal relative expansion and contraction between the parts of the casing having different thicknesses of metal therein, and also between the casing and the rotor, so that special provision must be made for compensating for such relative unequal distortion.

As specifically illustrated in Figs. 1, 2, 5 and 6 of the drawings, the present invention contemplates attaching connecting pieces 11, 10 directly to the lower and upper casings 30, 31 respectively, these connecting pieces being rigidly attached to the casing sections and being movably associated with a set of coaxial pins 15 and blocks 13 pivotally supported by the pins 15 and slidable within the lower connecting pieces 11. The pins 15 are rigidly attached to the bearing pedestal 6, and the pivot block connection will obviously permit free movement of the outer ends of the connecting pieces 11, 10 in a vertical plane without introducing a tendency toward moving the bearing structure vertically. The connecting pieces 11, 10 are rigidly united as clearly shown in Fig. 1, and the pivot pins 15 and blocks 13 besides permitting free vertical movement of the outer ends of the connecting pieces relative to the pedestal 6, also permit free relative angular displacement of these elements. It is desirable to make provision for such relative angular displacement, because the casing 2 besides varying in length, is also caused to tilt relative to the horizontal in the event that the lower and upper casing sections 30, 31 are subjected to differences in temperature.

Figure 1:
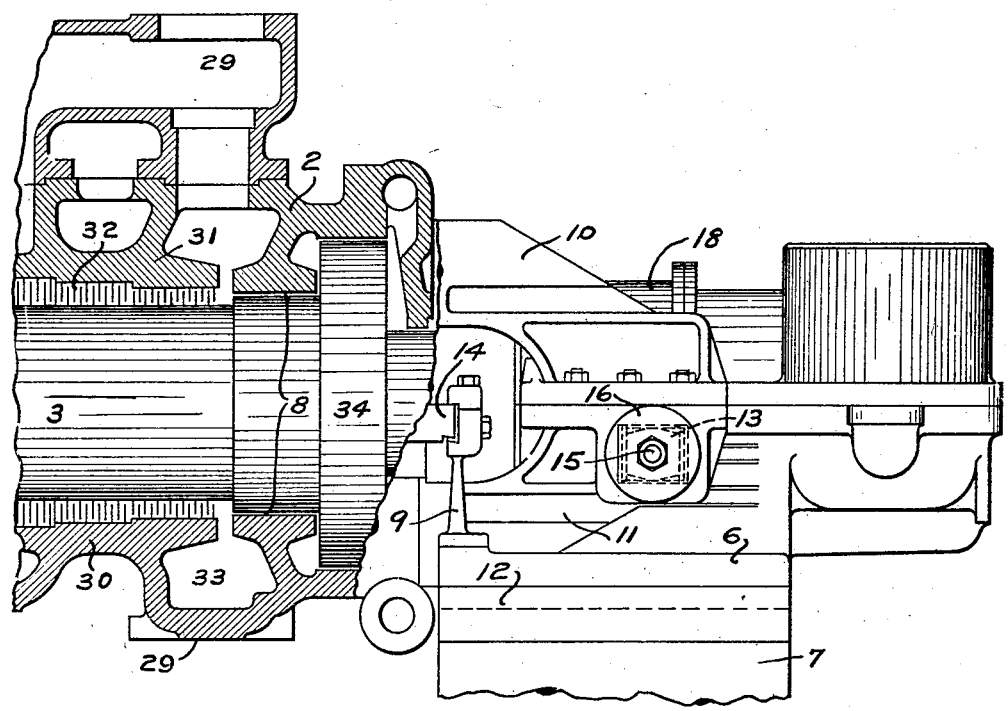
Fig. 1 is a part sectional fragmentary side elevation of an improved casing support and rotor bearing structure for a steam turbine.
Figures 2, 3, 4:
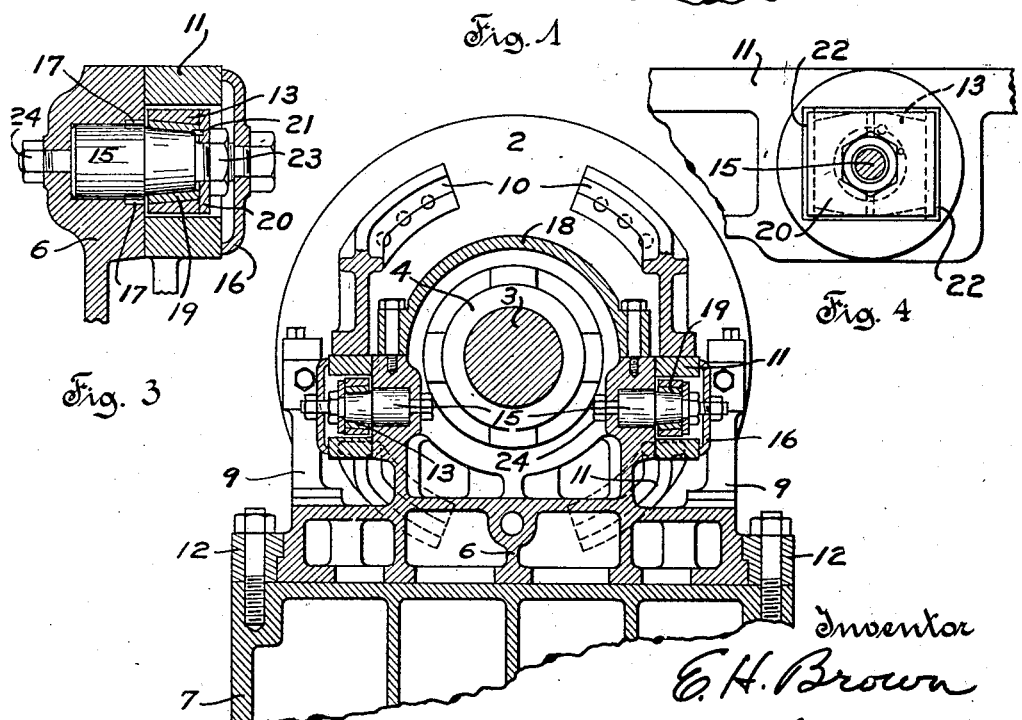
Fig. 2 is a transverse vertical section through the improved supporting structure of the turbine disclosed in Fig. 1.
Fig. 3 is an enlarged transverse vertical section through one of the sliding pivotal supports for the casing.
Fig. 4 is an enlarged side elevation of one of the sliding pivotal casing supports with the end cap removed.

The pivot pins 15 are detachably secured to the upper portion of the pedestal 6 as shown in Fig. 3, by means of locking keys 17 and clamping nuts 24, and the outwardly projecting tapered ends of the pins 15 are provided with tapered sleeves 19 which are fastened to the pivot pins 15 by means of locking keys 21 and clamping nuts 23 which coact with intervening retaining plates 20. The retaining plates 20 serve to retain the pivot blocks 13 in proper position upon the sleeves 19 on which the blocks 13 are pivoted. Closure caps 16 are mounted upon the extreme outer ends of the pivot pins 15, and coact with the outer faces of the connecting pieces 11, being held in position by means of retaining nuts or cap screws, as shown.

The rotor or spindle 3 which is housed within the casing 2, comprises revolving blading 32 which cooperates with fixed intervening blades mounted in the casing sections 30, 31; a balance piston 34 having annular packing ridges 8 cooperating with similar intervening packing strips carried by the casing 2 near the steam inlet chamber 33; and a shaft extending through the casing end walls and over the bearing pedestal 6. The rotor is positioned with but limited clearances measured longitudinally of the rotor axis, between the movable blading 32 and packing ridges 8, and the adjacent stationary elements associated with the casing 2, so that any change in shape or distortion of the cylinder wall, may cause serious damage to the blading or packing elements, unless properly compensated for. The casing 2 has its lower section 30 and hence the entire weight thereof, mounted upon struts 9 which rest directly upon the base of the pedestal 6 and are deflectable in a direction longitudinally of the rotor axis. The struts coact with the flanges 14 of the lower section 30 through insulating pads which prevent transmission of temperature changes from the flanges to the struts and vice versa. The base of the pedestal 6 upon which the struts 9 rest, is slidably mounted upon the bearing base 7 between parallel guides 12 which extend longitudinally of the rotor axis. The flexibility of the struts 9 compensates for longitudinal expansion or contraction of the turbine casing 2 relative to the rotor 3, whereas simultaneous longitudinal expansion or contraction of the casing and rotor is permitted by virtue of the slidable mounting of the pedestal 6 which supports both the struts 9 and the thrust-bearing of the rotor 2. The strut support for the casing, obviously entirely relieves the heavy flanges 14 and other parts of the casing 2 from strains due to confinement thereof against free expansion and contraction. The end of the pedestal 6 adjacent to the end of the casing 2, is provided with a vertical recess 28 with which a lug 27 formed on the lower casing section 30, coacts for the purpose of retaining the casing 30 centralized with respect to the vertical longitudinal plane containing the rotor axis.

The rotor shaft at the high pressure end of the turbine, rests within a guiding bearing 4 which is provided with a spherical seating or shell 25, as shown in Fig. 5, and is also provided with a thrust collar 5 rigidly attached to the shaft. The thrust collar 5 is cooperable with bearing plates or shoes 26 which are adjustably associated with the pedestal 6, in order to positively prevent axial displacement of the rotor relative to the thrust bearing housing 35 and to the pedestal 6. The thrust bearing is, however, adjustable relative to the pedestal 6 and longitudinally of the rotor axis, with the aid of mechanism provided for that purpose and cooperating with the housing 35. The guide and thrust bearings are normally enclosed by means of a detachable bearing cap 18 which may be removed to permit access to the bearing structure, without disturbing the pivot pins 15 and the elements associated therewith.

During normal operation of the turbine, the high pressure steam is admitted to the annular space 33 through an inlet 29, and the steam passes from the space 33 through the bladed section of the turbine in direct contact with the lower and upper casing sections 30, 31. Due to the fact that it is impossible to uniformly apply the steam to the metallic parts, it will be apparent that there must be relative variations in the expansion and contraction of the turbine parts. These relative variations in expansion and contraction are compensated for, by the supporting structure herein described, which will entirely relieve the various elements from undesirable stresses or possible damage. The manner in which this supporting structure functions, is dependent upon the conditions which produce the relative displacement, and upon the specific formation of the casing.

The lug 27 cooperating with the recess 28 of the bearing pedestal 6, functions to maintain the turbine housing centralized with respect to the rotor axis. By supporting the turbine housing upon the pedestal 6 through the struts 9, and by additionally supporting the pedestal 6 so that it may move longitudinally of the rotor axis between the guides 12, it will be apparent that uniform expansion of the turbine casing and rotor will be taken care of by sliding of the pedestal 6 upon the base 7. Due to the unsymmetrical formation of the casing 2 and the use of relatively heavy flanges 14 connecting the casing sections, it will be apparent that under certain conditions the relatively thin upper and lower portions of the casing will expand or contract more rapidly than the massive flanges 14. By providing the connecting pieces 10, 11 associated with the relatively thin portions of the casing, and by supporting the flanges 14 upon the flexible struts 9, such relative expansion and contraction of the light and heavy casing portions is also permitted without undesirably stressing the elements. If the expansion or contraction of the thin upper and lower portions of the casing relative to the flanges 14 is equal, then the struts 9 will be sufficient to compensate for this relative movement. Assuming for instance, that the expansion of the thin upper and lower casing portions is greater than that of the flanges 14, then the entire bearing pedestal 6 will be moved away from the turbine casing through the connecting pieces 10, 11 and the pedestal 6 will be permitted to move away from the flanges 14 by virtue of the flexibility of the struts 9. If the lower and upper casing portions expand or contract at a different rate of speed, there will be slight tilting of the casing with respect to the rotor axis, and the connecting pieces 10, 11 will cooperate with the pivot pins 15 and with the blocks 13, to permit such tilting without undesirably stressing the elements. It will thus be noted that the supporting structure will effectively compensate for any unequal expansion or contraction of the casing, without damaging the machine.

It will also be apparent that by properly proportioning and constructing the various elements, the expansion or contraction of one element may be advantageously utilized to vary the clearances between the rotating and stationary parts. By properly forming the guideways for the blocks 13, tilting movement of the casing caused by unsymmetrical construction thereof, may likewise be utilized to adjust the clearances between the stationary and movable parts. The fact that the connecting pieces are secured to the thin walls of the casing and extend to a point of support remote from these walls, provides a support for the casing wherein movement thereof may be transferred to the rotor in a manner which will avoid possible damage of the rotor due to expansion of the casing. These connecting pieces may be utilized to good advantage in a structure wherein the flanges 14 are omitted, and the invention is obviously capable of application to machines other than steam turbines.

It should be understood that it is not desired to limit the invention to the exact details of construction and operation herein shown and described for various modifications within the scope of the claims may occur to persons skilled in the art.

It is claimed and desired to secure by Letters Patent:

1. In combination, a casing, a flexible direct support for said casing, a rotor within said casing, a bearing for said rotor independent of said casing and of said support, and means providing a horizontal pivotal connection between said casing and said bearing.

2. In combination, a casing, a flexible direct support for an end of said casing, a rotor within said casing, a bearing for said rotor located beyond said casing end and functioning independently of said casing support, and means both horizontally pivotally and slidably connecting said casing and said bearing.

3. In combination, a casing having a relatively massive flange, a rotor within said casing, a bearing for said rotor located outside of said casing, supporting means for said bearing slidable longitudinally of the rotor axis, and a flexible direct support for said casing coacting with said flange and with said supporting means.

4. In combination, a casing, a rotor within said casing, a bearing for said rotor, supporting means for said bearing slidable longitudinally of the rotor axis, and means horizontally pivotally connecting said casing and said bearing.

5. In combination, a casing, a rotor within said casing, a bearing for said rotor located adjacent an end of said casing, supporting means for said bearing slidable longitudinally of the rotor axis, a flexible direct support for said casing carried by said supporting means, and means horizontally pivotally and slidably connecting said casing and said supporting means adjoining said bearing.

6. In combination, a casing, a rotor within said casing, a combined guide and thrust bearing for said rotor, means for slidably supporting said bearing, a flexible direct support for said casing carried by said slidable supporting means, and means functioning independently of said flexible support for slidably and horizontally pivotally connecting said casing and said bearing.

7. In combination, a casing, a rotor within said casing, a bearing for said rotor located adjacent an end of said casing, supporting means for said bearing slidable longitudinally of the rotor axis, means between said casing and said supporting means for centralizing said elements with respect to the rotor axis, and a flexible direct support for said casing carried by said supporting means, said support permitting lateral movement of said casing away from said centralizing means.

8. In combination, a casing, a rotor within said casing, a bearing for said rotor located adjacent an end of said casing, supporting means for said bearing slidable longitudinally of the rotor axis, means for centralizing said casing with respect to said supporting means, and means both horizontally, pivotally and slidably connecting said casing and said supporting means directly adjacent to said bearing.

9. In combination, a casing, a rotor within said casing, a bearing for said rotor located adjacent an end of said casing, supporting means for said bearing slidable longitudinally of the rotor axis, means for vertically centralizing said casing with respect to said supporting means, a flexible direct support for said casing carried by said supporting means and permitting relative horizontal expansion of said casing, and means both horizontally pivotally and slidably connecting said casing and said supporting means remote from said flexible direct support.

10. In combination, a casing comprising a massive section and relatively thin sections located on opposite sides of said massive section, a rotor within said casing, a bearing for said rotor located adjacent an end of said casing, and connecting means including a horizontal pivot for uniting said thin casing sections with said bearing.

11. In combination, a casing comprising a massive section and relatively thin sections located on opposite sides of said massive section, a rotor within said casing, a bearing for said rotor located adjacent an end of said casing, a pedestal supporting said bearing, a direct flexible support connecting said pedestal and said massive casing section, and connecting means including a horizontal pivot for uniting said casing sections with said bearing.

12. In combination, a casing comprising a massive section and relatively thin sections located on opposite sides of said massive section, a rotor within said casing, a bearing for said rotor located adjacent an end of said casing, a pedestal supporting said bearing, a direct flexible support connecting said pedestal and said massive casing section, and connecting pieces uniting said casing sections with said bearing, said connecting pieces being horizontally pivotally associated with said pedestal.

In testimony whereof, the signature of the inventor is affixed hereto.

EDWIN H. BROWN.